United States Patent
Nayfeh et al.

(10) Patent No.: US 8,645,198 B1
(45) Date of Patent: Feb. 4, 2014

(54) EVALUATING ADVERTISING STRATEGIES BY SIMULATING THEIR APPLICATION

(75) Inventors: Basem Nayfeh, Mercer Island, WA (US); Andrew Chen, Seattle, WA (US); John Richmond, Seattle, WA (US); Maciek Kozyrczak, Bothell, WA (US); Jason Carlisle, Seattle, WA (US); Rob Cromwell, Seattle, WA (US); Brad Hefta-Gaub, Seattle, WA (US)

(73) Assignee: AudienceScience Inc., Bellevue, WA (US)

( * ) Notice: Subject to any disclaimer, the term of this patent is extended or adjusted under 35 U.S.C. 154(b) by 2164 days.

(21) Appl. No.: 11/236,319

(22) Filed: Sep. 27, 2005

Related U.S. Application Data (63) Continuation of application No. 11/000,537, filed on Nov. 29, 2004, now abandoned, which is a continuation of application No. 10/763,938, filed on Jan. 23, 2004, now abandoned.

(51) Int. Cl.
*G06Q 30/00* (2012.01)
*G07G 1/14* (2006.01)

(52) U.S. Cl.
USPC ........................................ 705/14.1

(58) Field of Classification Search
USPC .............................................. 705/14
See application file for complete search history.

(56) References Cited

U.S. PATENT DOCUMENTS

| | | | |
|---|---|---|---|
| 5,848,396 A * | 12/1998 | Gerace | 705/10 |
| 6,829,780 B2 * | 12/2004 | Kraft et al. | 725/42 |
| 2003/0014304 A1 * | 1/2003 | Calvert et al. | 705/14 |
| 2003/0074252 A1 * | 4/2003 | Chandler-Pepelnjak et al. | 705/10 |
| 2003/0149937 A1 * | 8/2003 | McElfresh et al. | 715/517 |

* cited by examiner

*Primary Examiner* — Arthur Duran
(74) *Attorney, Agent, or Firm* — Perkins Coie LLP (57) ABSTRACT

A facility for evaluating an advertising strategy with respect to a subject website is described. The facility receives a specification of the advertising strategy. The specification indicates how to apply the advertising strategy to select one of a plurality of advertising campaigns in response to each page request against the subject website. The facility applies the advertising strategy in accordance with the received advertising strategy specification to a sequence of page requests earlier received against the subject website. The facility then assesses the results of applying the advertising strategy in accordance with the received advertising strategy specification to the earlier-received page requests.

26 Claims, 10 Drawing Sheets

FIG. 4 advertising specification table — 126

| campaign identifier | price | remaining impressions | type | type-specific information | advertising message URL |
|---|---|---|---|---|---|
| 1 | $10 | 96,824 | buy-out | page_url=www.subject.com/home | www.adserving.com/advl/message.jpg |
| 2 | $5 | 9,235 | behavioral | segment=home-buyers | www.adland.com?ad_id=5104 |
| 3 | $2 | 445,122 | run-of-site | max=500,000 | www.adland.com?ad_id=1003 |

511 — campaign identifier
512 — price
513 — remaining impressions
514 — type
515 — type-specific information
516 — advertising message URL
501, 502, 503

EVALUATING ADVERTISING STRATEGIES BY SIMULATING THEIR APPLICATION

CROSS REFERENCE TO RELATED APPLICATIONS

This application is a continuation of U.S. patent application Ser. No. 11/000,537, filed Nov. 29, 2004 now abandoned, which is a continuation of U.S. patent application Ser. No. 10/763,938, filed Jan. 23, 2004 now abandoned, each of which is hereby incorporated by reference in its entirety.

TECHNICAL FIELD

The present invention is directed to the field of electronic advertising, and, more particularly, to the field of advertising analytics.

BACKGROUND

The term "web publishers" refers to operators of web sites made up of one or more web pages (hereafter "pages") that contain various kinds of content. It is typical for a web publisher (hereafter a "publisher") to sell to web advertisers "advertising space"—the opportunity to include an advertising message on web pages of its web site when presented to users visiting its web site.

Web publishers have a significant degree of flexibility in selling advertising space to web advertisers (hereafter "advertisers"). Advertising space may be sold using a wide variety of schemes, including (1) exclusive positional: selling the exclusive right to include an advertising message in a particular position on a particular page; (2) behavioral: selling the right to include an advertising message on one or more pages presented to users that are members of a specified group, that have performed a specified action or activity, or that have one or more other specified characteristics; and (3) run-of-site: selling the right to include an advertising message on pages and in positions chosen by the publisher. Advertising campaigns using different schemes may be sold—and may operate—simultaneously on a publisher's web site.

The level of flexibility available to publishers is further expanded by various aspects of individual schemes—such as the selection criteria for behavioral schemes—and by various aspects that are common to all of the schemes—such as the price paid by the advertiser for each presentation, or "impression," of an advertising message included on pages of the advertiser's site.

It is typical for the advertising sales strategy for a particular publisher to be established manually by an employee of the publisher, using their best guess about the strategy most likely to maximize advertising revenue, and to maximize any other objectives favored by the advertiser. While such "best guess" strategies are sometimes successful, they often fall far from maximizing advertising revenue, or maximizing or fully satisfying other objectives favored by the publisher.

As one example, a publisher may need to determine, if a new advertising campaign is to be added to an existing set of advertising campaigns for a web site, the number of impressions that will be presented as part of the new advertising campaign. This is typically a function of the number of web pages that will be viewed on the web site, as well as the interaction between the new campaign and the existing campaigns in "competing" to be included on these viewed web pages. Being able to anticipate the number of impressions that will be presented in the advertising campaign can be important in setting the advertisers' expectations for the campaign's results. In some cases, the publisher explicitly or implicitly guarantees that a certain number of impressions will be presented in the advertising campaign, which makes it even more important for the publisher to determine the number of impressions that will be presented in the advertising campaign.

In view of the foregoing, a decision-support tool that enabled a publisher to prospectively test and evaluate one or more possible advertising sales strategies would have significant utility.

DETAILED DESCRIPTION

A software facility for evaluating a multiple-campaign advertising sales strategy by simulating its execution ("the facility") is described. For a particular publisher and a configurable future evaluation period, the facility selects a set of page requests earlier received by the publisher that will be representative of the page requests to be received during the future evaluation period. The facility simulates the delivery and processing of these earlier requests using the advertising sales strategy to be evaluated, and determines the number of impressions of each campaign's advertising message presented during the simulation. This number of impressions presented during the simulation can be compared to a desired number of impressions to be presented for the campaign, to determine whether the simulated strategy results in at least the desired number of impressions being presented. The facility can be used to simulate the application of a number of different advertising strategies for the same publisher and evaluation period, enabling the publisher to compare the results for each strategy and pursue the strategy having the best results.

In some embodiments, the facility uses a web client emulator to submit the selected representative page requests to a web server, which in turn submits advertising selection requests to an advertising selection module that processes the advertising selection requests using the current advertising strategy. In other embodiments, the facility uses a simulator that translates the selected representative page requests into advertising selection requests, and directly submits these advertising selection requests to the advertising selection module for processing using the current advertising strategy.

In some embodiments, the facility enables a user to configure certain constraints, and optimizes an advertising strategy within the configured constraints. In some embodiments, the facility performs such optimization using reiterative differential simulation, while in others, the facility performs such optimization using predictive modeling techniques.

By enabling publishers to evaluate a number of different advertising sales strategies, the facility assists publishers to select an advertising strategy that maximizes expected revenue, and/or other goals of the publisher. By automatically seeking an advertising strategy that maximizes expected revenue, and/or other goals of the publisher, the facility more thoroughly maximizes such goals and requires less manual effort by the publisher. In these ways, the facility assists publishers to more effectively choose advertising strategies that favor its goals.

Figure 1:
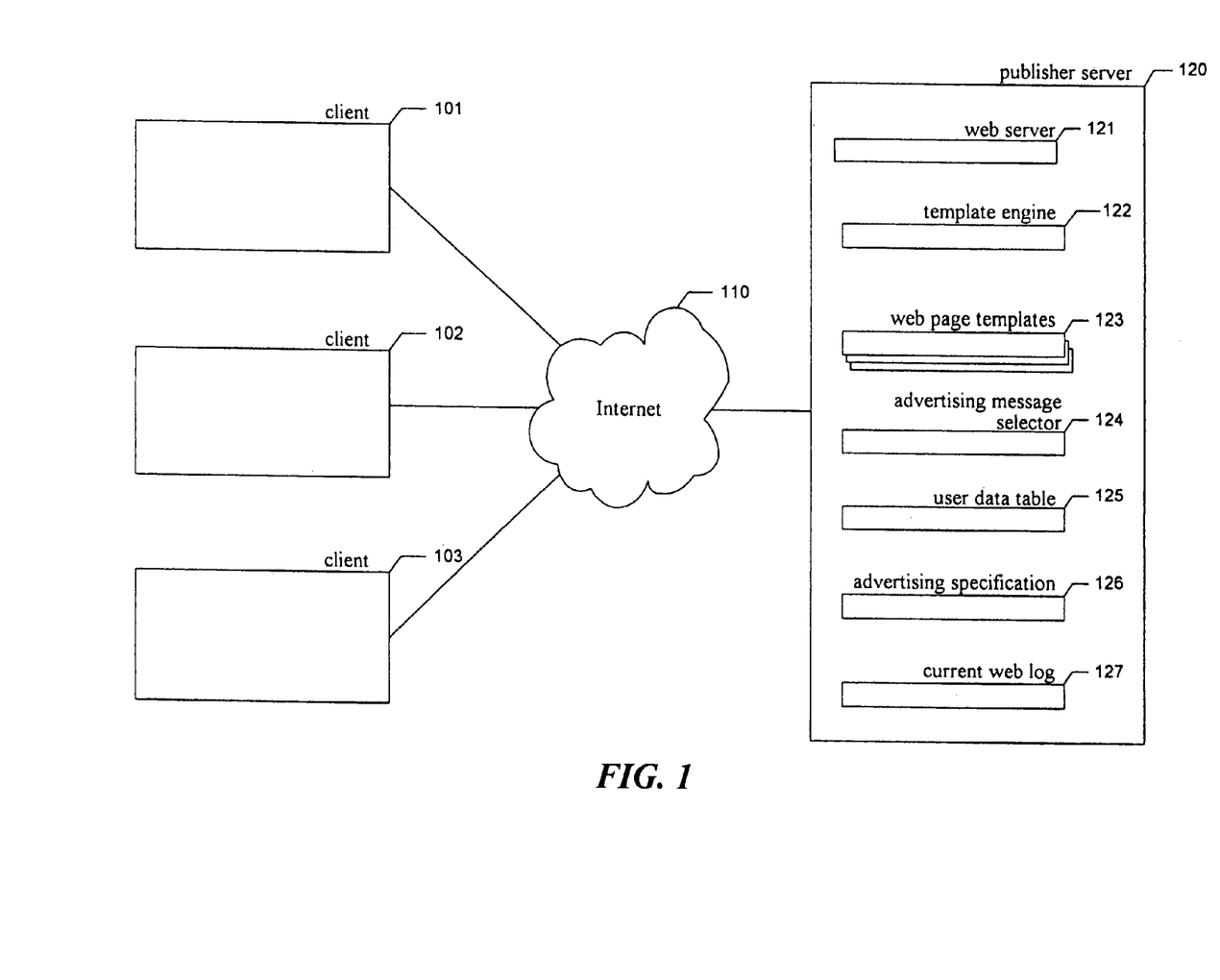
FIG. 1 is a block diagram showing a typical ad-serving environment in which the facility operates.

FIG. 1 is a block diagram showing a typical ad-serving environment in which the facility operates. The environment includes a number of clients, such as clients 101-103, each containing a web client program that may be used by a user to request web pages of the subject web site from a publisher server 120 via the Internet 110 or another network. Each client may be one of a wide variety of device types, and may be connected by different means to the publisher server. The publisher server includes a web server program 121 for receiving and processing page requests, such as HTTP GET requests; a template engine 122 for dynamically generating requested web pages in accordance with a set of web page templates 123; an advertising message selector program 124 for selecting a particular advertising message to include in a requested web page based upon information in the web page request, the contents of a user data table 125, and an advertising specification 126 indicating how advertising messages are to be selected; and a current web log 127 in which the web server stores entries each containing information about one page request received and serviced by the web server, such information typically including some or all of the information contained in the received request.

While various functionalities and data are shown in FIG. 1—and in FIGS. 6 and 8, discussed below—as residing on particular computer systems that are arranged in a particular way, those skilled in the art will appreciate that such functionalities and data may be distributed in various other ways across computer systems in different arrangements.

Figure 2:
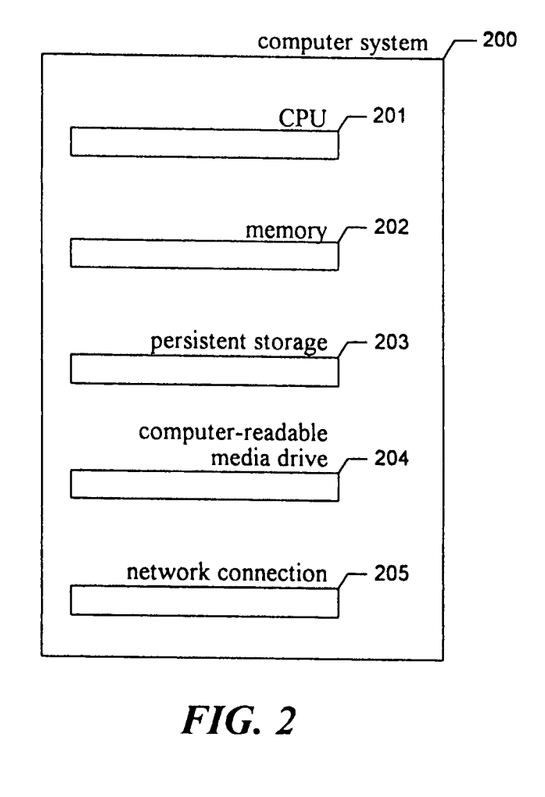
FIG. 2 is a block diagram showing some of the components typically incorporated in at least some of the computer systems and other devices on which the facility executes.
Figure 6:
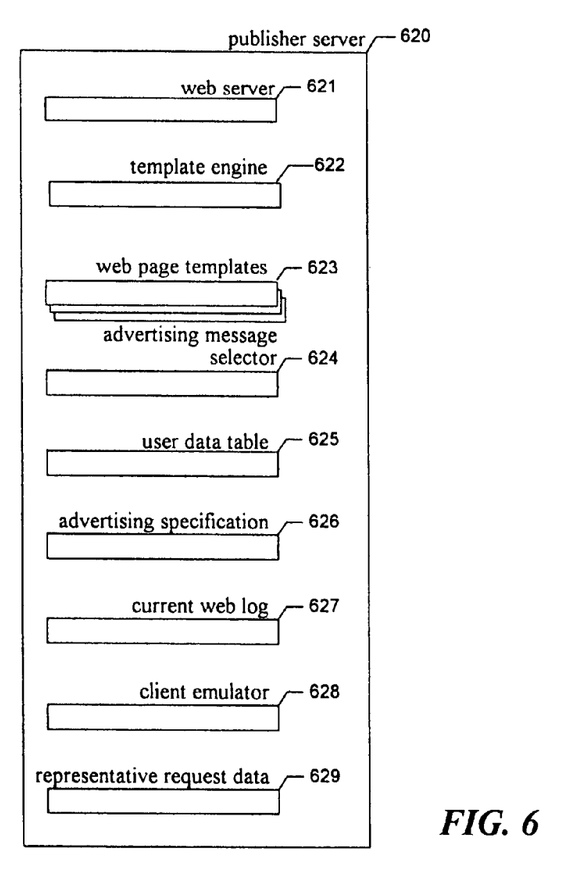
FIG. 6 is a block diagram showing typical contents of the publishing server used by the facility in accordance with the first architecture.
Figure 8:
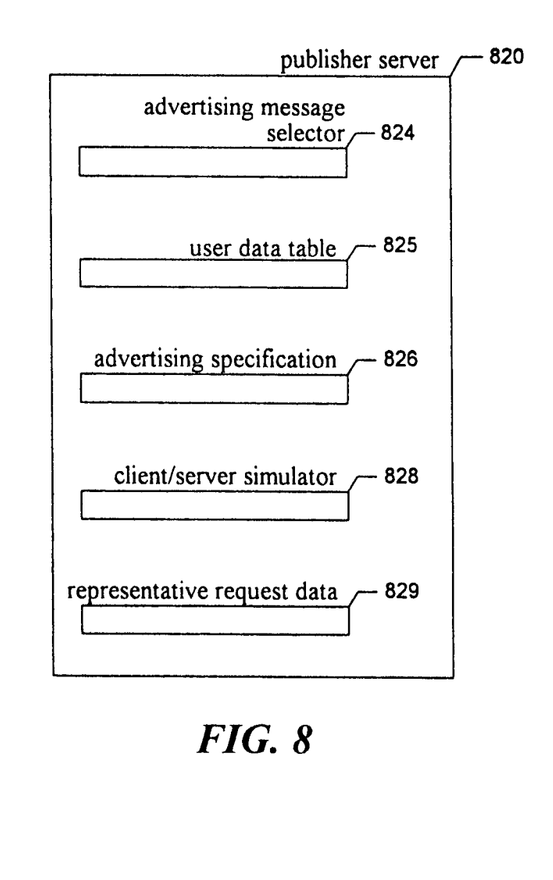
FIG. 8 is a block diagram showing typical contents of the publishing server used by the facility in accordance with the first architecture.

FIG. 2 is a block diagram showing some of the components typically incorporated in at least some of the computer systems and other devices on which the facility executes, including some or all of those depicted in FIGS. 1, 6, and 8. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, one of ordinary skill in the art will appreciate that the facility may be implemented using devices of various types and configurations, and having various components.

Figure 3:
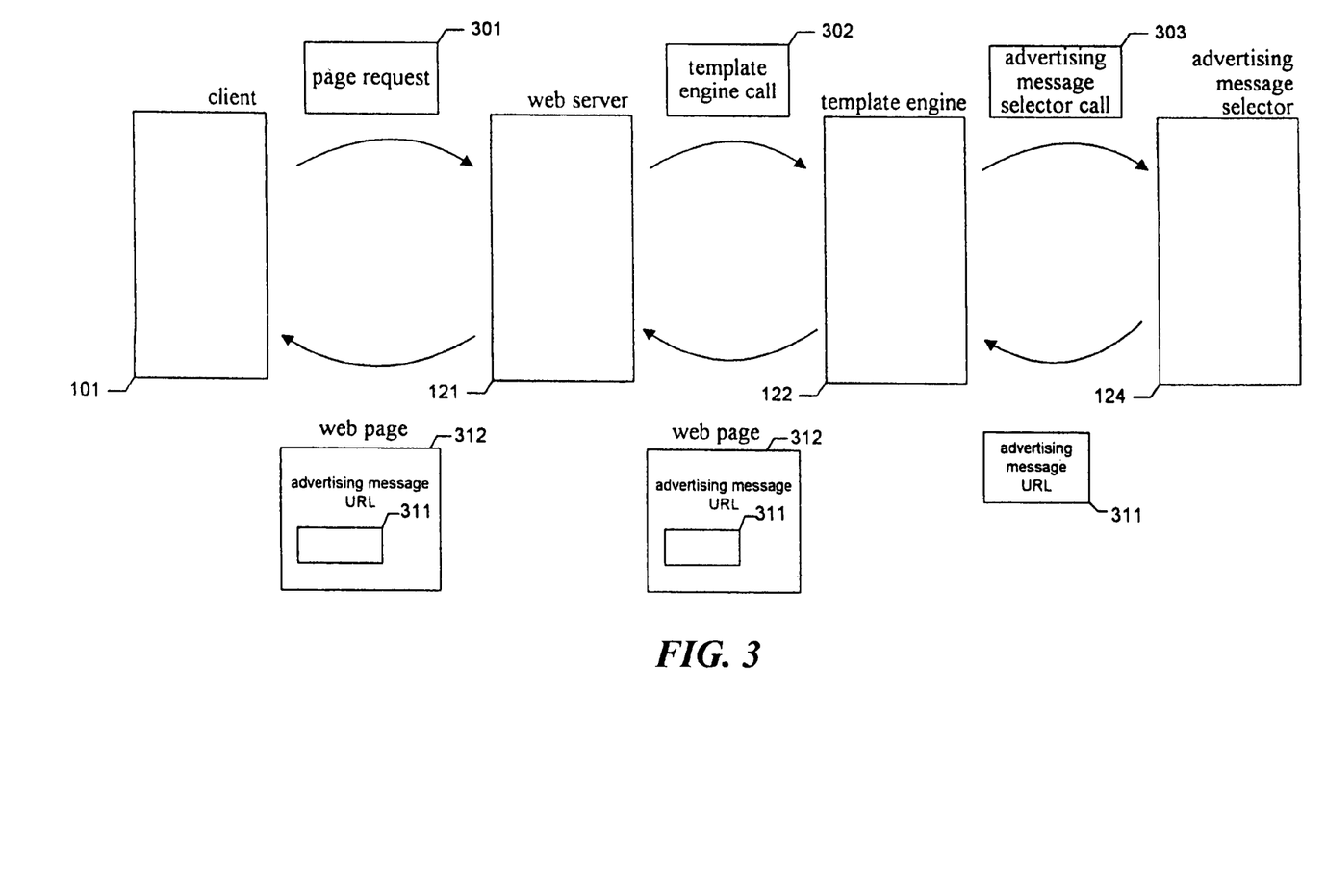
FIG. 3 is a high-level flow diagram showing how pages of the subject web site containing selected advertising messages are generated.
Figure 4:
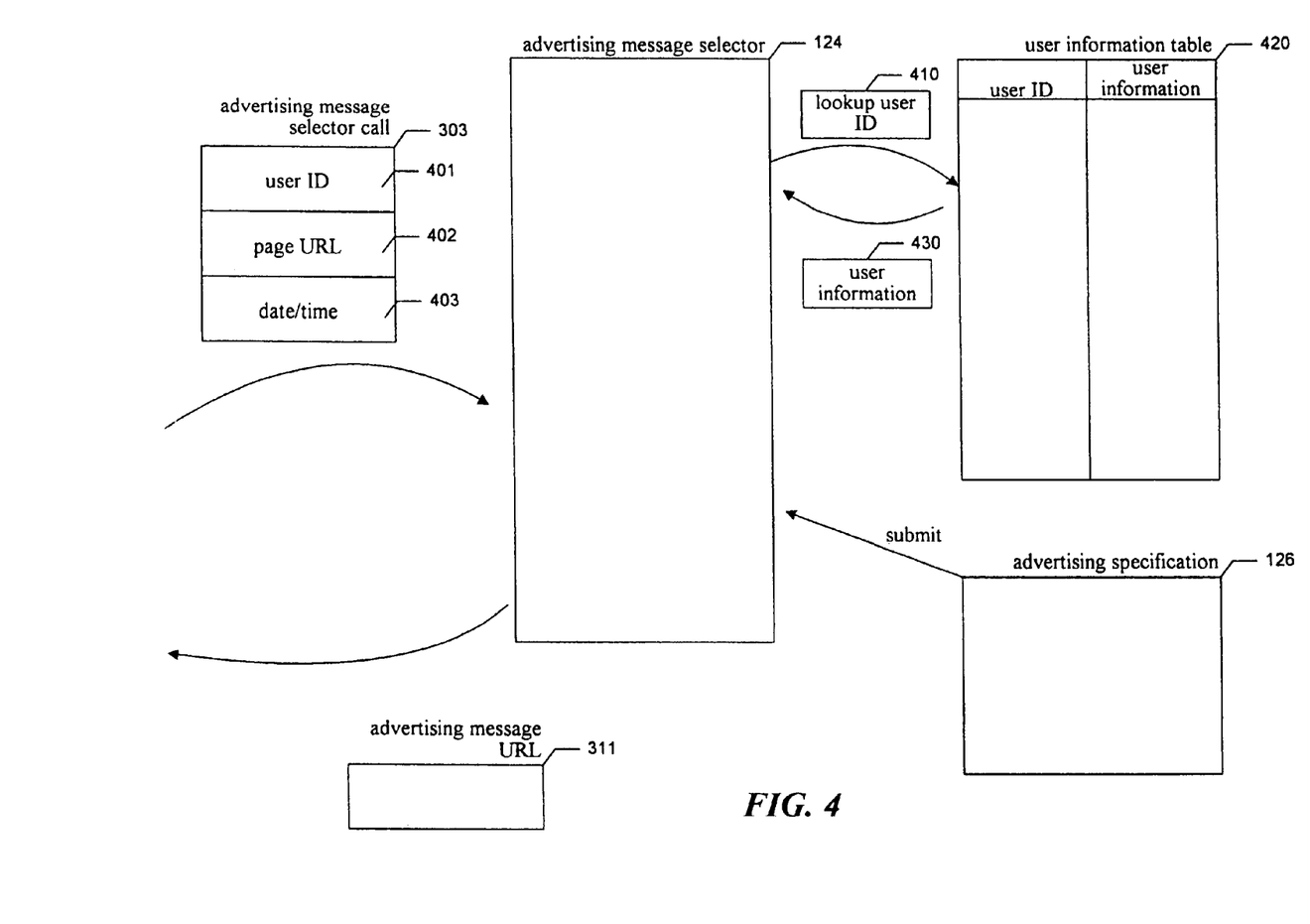
FIG. 4 is a data flow diagram showing the advertising message selector's selection of an advertising message in response to an advertising message selector call from the template engine.
Figure 5:
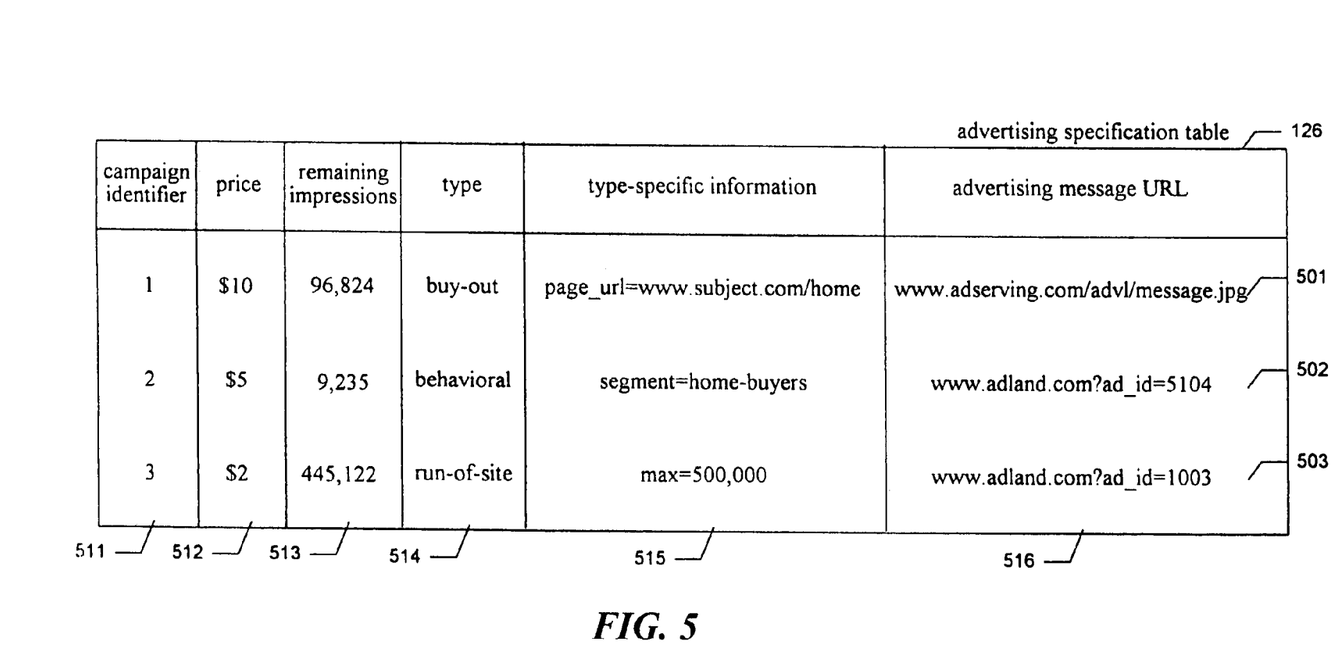
FIG. 5 is a data structure diagram showing a sample advertising specification.

FIGS. 3-5 show how pages of the subject web site containing selected advertising messages may be generated. It will be appreciated by those skilled in the art that pages containing selected advertising messages may also be generated in a variety of other ways.

FIGS. 3 and 4 are data flow diagrams showing how pages of the subject web site containing selected advertising messages are generated. FIG. 3 is a high-level flow diagram showing how pages of the subject web site containing selected advertising messages are generated. A client 101 sends a page request 301 to the web server 121. This page request typically includes a unique identifier identifying the user that sent the page request—typically retrieved from a cookie stored on the user's client, as well as information identifying the web page of the subject web site that is requested—typically a URL for the requested web page. The web server, in turn, makes a call 302 to the template engine 122 requesting that the template engine dynamically generate the page of the subject web site identified in the page request using a template corresponding to that page of the subject web site. The call 302 typically includes the user identifier from the page request. When it receives the template engine call, the template engine retrieves the page template corresponding to the requested web page and processes instructions contained in it, including an instruction to call the advertising message selector. When the template engine encounters this instruction, the template engine generates a call 303 to the advertising message selector 124 requesting that the advertising message selector select an advertising message for the page of the subject web site identified in the page request. As is discussed in more detail below in conjunction with FIG. 4, the advertising message selector selects a particular advertising message to be included in the generated web page, and returns a URL 311 usable to retrieve this advertising message to the template engine. The template engine incorporates the advertising message URL in the web page 312 that it is generating in response to the page request, and returns that generated web page to the web server, which in turn returns that web page to the requesting client.

FIG. 4 is a data flow diagram showing the advertising message selector's selection of an advertising message in response to an advertising message selector call from the template engine. FIG. 4 shows that the advertising message selector call 303 typically includes information from the page request 301 including the user ID 401, requested page URL 402, and request date/time 403. When the advertising message selector receives the advertising message selector call, it performs a lookup operation 410 on the user ID 401 against a user information table 420. The lookup operation returns user information 430 associated with the user ID 401 in the user information table. The user information may include a variety of information about the user that can be used by the advertising message selector to select an advertising message, including actions performed by the user; groups, segments, or populations to which the user belongs; and other attributes of the user. The advertising message selector further uses a submitted advertising specification 126, discussed in greater detail below in conjunction with FIG. 5, to select a particular advertising message for inclusion in the requested web page. The advertising message selector then returns the URL 311 of the selected advertising message to the template engine 122 in response to the advertising message selector call.

FIG. 5 is a data structure diagram showing a sample advertising specification. While the sample advertising specification is shown using a particular advertising specification scheme, those skilled in the art will appreciate that embodiments of the facility can operate in conjunction with advertising specifications generated and processed in accordance with a wide variety of other advertising specification schemes, including those in which different approaches are applied to select advertising campaigns in response to page requests.

The sample advertising specification 126 includes information about all of the advertising campaigns being conducted on behalf of advertisers on the subject web site. Rows 501-503 each correspond to a different advertising campaign. Each row is divided into a campaign identifier column 511 uniquely identifying the campaign among the campaigns specified by the advertising specification; a price column 512 indicating an amount of money that the advertiser will pay for 1,000 impressions of the advertising message—that is, inclusion of the advertising message in 1,000 generated pages of the subject web site; a remaining impressions column 513 indicating the number of impressions that may be served for the advertising campaign before a maximum number of impressions established for the advertising campaign is reached; a campaign type column 514 indicating the type of the campaign; a type-specific information column 515 containing information about the campaign that is specific to the campaign's type; and an advertising message URL column 516 that contains a URL that can be used to retrieve the advertising message to be presented in the campaign.

Row 501 indicates that campaign 1 has a price of $10 per 1,000 impressions; is of the buy-out type, meaning that, for a particular page of the subject web site, every instance of that page that is generated should contain the advertising message of this campaign; and has 96,824 remaining impressions. The type-specific information for this row identifies the home page of the subject web site as the page that is bought-out for this campaign, and identifies the URL of the associated advertising message.

Row 502 indicates that campaign 2 has a price of $5 per 1,000 impressions, is of the behavioral type, and has 9,235 remaining impressions. Behavioral campaigns, unlike buy-out campaigns, are insensitive to the identity of the requested web page. Rather, these campaigns are directed to users that are in a particular segment, have performed a particular activity or action, or have some other attribute. The type-specific information for this row indicates that this campaign is directed to users in a segment called home-buyers, such as users who have recently requested a web page containing a mortgage payment calculator more than a threshold number of times. The row further contains the URL of the advertising messages associated with the campaign.

Row 503 indicates that campaign 3 has a price of $2 per 1,000 impressions, is of the type run-of-site, and has 445,122 remaining impressions. Campaigns of this type are insensitive both to the identity of the requested page and segments, actions or activities, and other attributes of the user. This row contains the URL of the advertising message associated with this campaign.

The advertising message selector uses the advertising specification to select an advertising campaign and its advertising message for inclusion in the currently-requested web page by reading the rows of the advertising specification in a particular order, such as descending order of price, or in descending order of some other explicit or implicit indicator of priority. In each row, the advertising message selector tests the conditions associated with the specified campaign to see if the campaign applies to the current request. If so, the advertising message selector ceases its traversal of the advertising specification table, selects the current campaign and advertising message, returns the URL of the selected advertising message to the template engine, and decrements the number of remaining impressions in the row of the selected campaign.

In this example, for a new request, the advertising message selector traverses the advertising specification table in decreasing price order, and begins in row 501, and determines whether the request is for the home page of the subject web site. If so, the advertising message selector selects campaign 1, otherwise the advertising message selector continues in row 502 of the advertising specification. In row 502, the advertising message selector determines whether the user issuing the current request is a member of the segment home-buyers. If so, the advertising message selector selects campaign 2, otherwise the advertising message selector continues in row 503 of the advertising specification. In row 503, the advertising message selector selects campaign 3, as campaign 3 does not have any conditions that must be satisfied.

Figure 7:
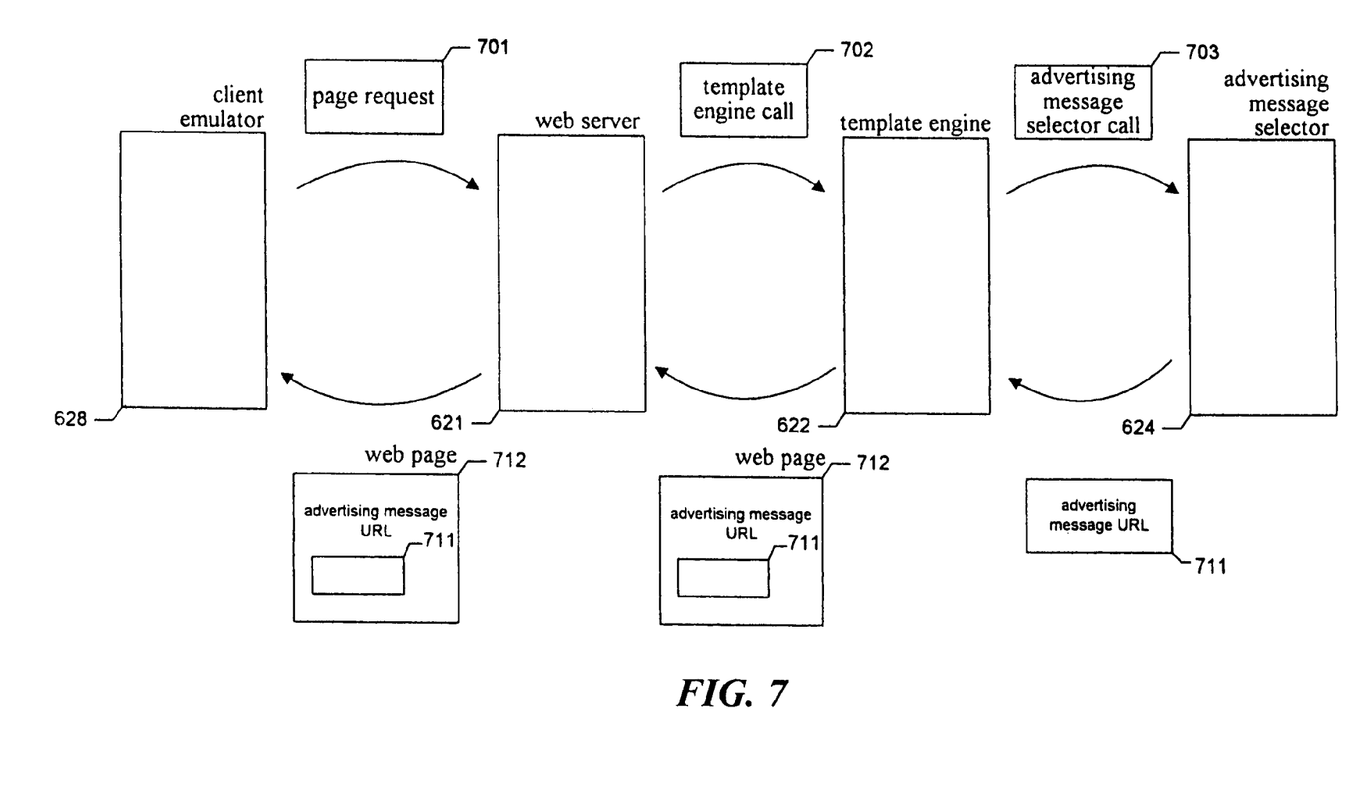
FIG. 7 is a data flow diagram showing operation of the facility in accordance with the first architecture.
Figure 9:
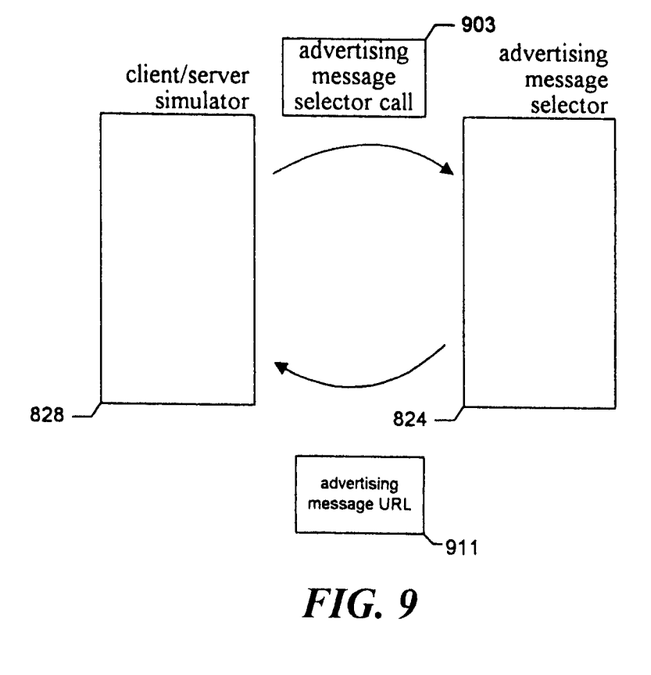
FIG. 9 is a data flow diagram showing the operation of the facility in accordance with the second architecture.

FIGS. 6-7 show a first architecture used by the facility in order to simulate the execution of a proposed advertising specification, while FIGS. 8-9 show a second architecture used by the facility to simulate execution of a proposed advertising specification. FIG. 6 is a block diagram showing typical contents of the publishing server used by the facility in accordance with The First Architecture. In FIG. 6, the publishing server 620 contains a web server 621, a template engine 622, a web page template 623, advertising message selector 624, user data table 625, advertising specification 626, and current web log 627 as shown in FIG. 1.

The publishing server further includes representative request data 629 identifying page requests earlier received for the subject web site that the facility has determined are representative of requests that are expected to be received during a future evaluation period over which the advertising specification is to be evaluated. The representative request data is typically generated by the facility by copying selected portions of the current web log 127 and/or archived copies thereof, and optionally modifying the copy, or by creating pointers into the current web log and/or archived copies. The representative request data typically covers a period of the same or almost the same length as the evaluation period. The representative request data further typically covers the most recent period of this length for which request data is available that is likely to be representative of the evaluation period. This selection may be performed in a variety of ways. For example, if the current day is Jul. 21, 2003, historical request data is available through Jul. 19, 2003, and the evaluation period is Aug. 1, 2003 through Aug. 31, 2003, the facility may select representative request data from one of the following foregoing periods: the most recent period of the same length as the evaluation period for which request data is available, here Jun. 19, 2003 through Jul. 19, 2003; the most recent period of the same length for which request data is available that begins on the same day of the week as the evaluation period, here Jun. 13, 2003 through Aug. 13, 2003; or the most recent period for which complete request data is available that matches the nature of the evaluation period, such as the most recent month for which complete request data is available—Jun. 1, 2003 through Jun. 30, 2003, the most recent month of the same length as August 2003 for which complete request data is available—May 1, 2003 through May 31, 2003, the same month during the last year—Aug. 1, 2002 through Aug. 31, 2002. Those skilled in the art will appreciate that the facility may use a variety of other approaches to identifying the period for the representative request data, some of which may consider different levels of time granularity.

The publisher server further contains a client emulator 628 that reads the representative request data and generates new page requests that mirror those in the representative request data for delivery to and service by the web server.

FIG. 7 is a data flow diagram showing operation of the facility in accordance with the first architecture. The facility may perform the operations shown in FIGS. 7 and 9 in a variety of contexts, including on the subject web site's production web server at a time when it is simultaneously serving live page requests for the subject web site, in an offline instance of the subject web site's web server that is not presently serving live page requests, or in a computer system that is never used as a live web server, including a computer system operated by a third-party service provider. For each request among the representative request data, the client emulator 628 issues a page request 701 mirroring the request. The page request 701 is received by the web server 621, which makes a call 702 to the template engine 622. In response, the template engine generates a call 703 to the advertising message selector 624. In response, the advertising message selector selects an advertising message for the request, and returns the URL 711 for the selected advertising message to the template engine. The template engine generates a web page 712 that incorporates the selected advertising message URL 711, and passes it back to the web server. The web server passes the generator web page to the client emulator, which analyzes the web page to determine which advertising message was selected for the page request. The cycle is repeated for each request identified by the representative request data. The client emulator tallies the number of times that the URL for each advertising message is returned by the advertising message selector during the course of processing all of the representative request data. In various embodiments, the client emulator performs additional activities to more effectively emulate the submission by a real web client of the page requests represented by the representative request data. As one example, in some embodiments, when the client emulator receives a web page 712 that attempts to set a cookie for the requesting user, embodiments of the client emulator store the enclosed cookie data for the requesting user, so that, when the client emulator sends future page requests on behalf of the requesting user, this cookie data can be included in these page requests as expected by the web server.

The first architecture has the advantage that it uses the existing web server, template engine, and advertising message selector employed by the publishing server, and requires only the creation and use of a client emulator capable of transforming representative request data into corresponding live page requests.

FIGS. 8-9 show a second architecture used by the facility to simulate execution of a proposed advertising specification. FIG. 8 is a block diagram showing typical contents of the publishing server used by the facility in accordance with the first architecture. The publisher server 820 includes an advertising message selector 824, a user data table 825, and an advertising specification 826 as shown in FIG. 1. The publisher server further includes representative request data 829 that is similar to representative request data 629 discussed above in conjunction with FIG. 6. The publisher server further contains a client/server simulator 828 that reads the representative request data and directly calls the advertising message selector for each request identified by the representative request data.

FIG. 9 is a data flow diagram showing the operation of the facility in accordance with the second architecture. The client/server simulator 828 reads the next request from the representative request data, and directly makes a corresponding call 903 to the advertising message selector 824. In response to the call, the advertising message selector selects a particular advertising message, and returns the URL 911 for that advertising message to the client/server simulator. The client/server simulator tallies the number of times that the URL for each advertising message is returned by the advertising message selector during the course of processing all of the representative request data.

The second architecture has the advantages that it does not incur the overhead of calling the web server and template engine for each request among the representative request data; that it is not necessary for the client/server simulator to analyze a generated web page in order to determine the identity of the advertising message selected by the advertising message selector; and that it is not necessary to create a new program that incorporates the logic of the advertising message selector.

The facility may also employ a third architecture (not shown), in which the client-server simulator 828 and the advertising message selector 824 are merged to create a single autonomous program that reads the representative request data and applies the advertising specification to select an advertising message for each request identified by the representative request data. The third architecture has the advantage that it minimizes interfaces between different programs, and may execute more efficiently in some environments.

Figure 10:
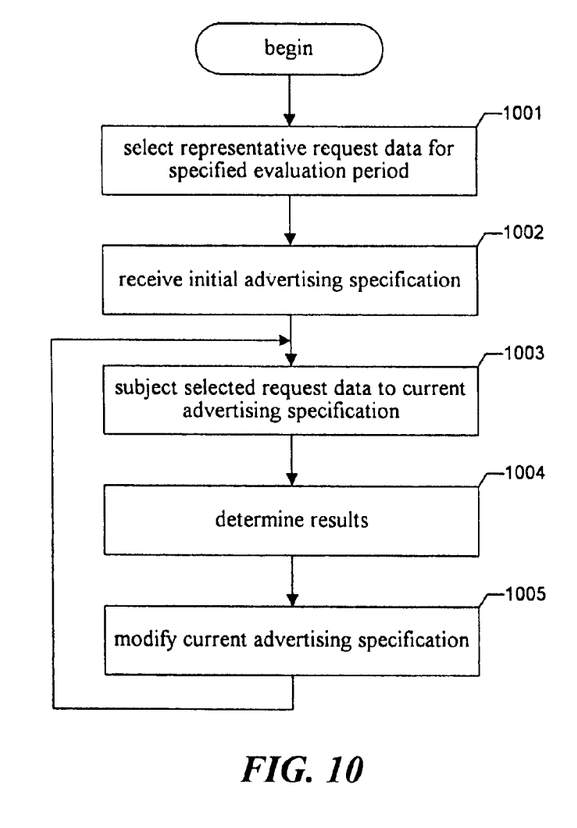
FIG. 10 is a flow diagram showing steps typically performed by the facility to evaluate an advertising specification.

FIG. 10 is a flow diagram showing steps typically performed by the facility to evaluate an advertising specification. In step 1001, the facility selects representative request data for a future evaluation period, such as an evaluation period specified by a user. In step 1002, the facility receives an initial advertising specification, such as an initial advertising specification submitted by a user. In step 1003, the facility subjects the representative request data selected in step 1001 to the current advertising specification, such as is shown in FIGS. 7 and 9 and discussed above. In step 1004, the facility determines the results of the simulation performed in step 1003, such as by determining the number of impressions presented for each advertising campaign specified by the advertising specification, determining whether the number of impressions presented for each advertising campaign specified by the advertising specification is at least as large as a desired number of impressions for the campaign, determining the total amount of revenue that will be generated by serving those impressions, or otherwise assessing the success of the simulated advertising specification with respect to other goals of the operator of the subject web site. In step 1005, the facility optionally modifies the current advertising specification, such as directly in response to user input specifying particular modifications to the current advertising specification, or such as by automatically modifying the current advertising specification in a manner anticipated to improve the advertising specification's satisfaction of the goals of the operator of the subject web site. After step 1005, the facility continues in step 1003 to repeat the simulation for the advertising specification as modified in step 1005. In some embodiments (not shown), the facility uses the results determined for a number of different advertising specifications to create a model of the effectiveness of those different advertising specifications, and uses the model to predict an advertising specification that will favor higher total advertising revenue or other goals of the operator of the facility. This predicted advertising specification may similarly be tested using the simulation approach employed by the facility.

It will be appreciated by those skilled in the art that the above-reads-described facility may be straightforwardly adapted or extended in various ways. For example, the facility may be straightforwardly adapted to operating in conjunction with a variety of different ad-serving mechanisms that are organized and/or operate in different ways, and/or that are installed on a variety of computer systems or other devices. Further, the facility may be used to evaluate advertising specifications specifying advertising campaigns of a wide variety of types specified in a wide variety of manners, and advertising message selectors that operate in virtually any manner. While the foregoing description makes reference to preferred embodiments, the scope of the invention is defined solely by the claims that follow and the elements recited therein.

We claim:

1. A method performed by a computing system to evaluate an advertising strategy with respect to a subject web site, the method comprising:
   receiving, by the computing system, a specification of the advertising strategy, the specification indicating how to apply the advertising strategy to select one of a plurality of advertising campaigns in response to each page request against the subject web site, wherein the plurality of advertising campaigns each correspond to a different advertising campaign conducted on behalf of at least one advertiser on the subject web site;
   applying, by the computing system, the advertising strategy in accordance with the received advertising strategy specification to a sequence of page requests earlier received against the subject web site wherein applying the advertising strategy includes selecting one of the plurality of advertising campaigns for each page request in the sequence of earlier-received page requests; and
   assessing, by the computing system, the results of applying the advertising strategy in accordance with the received advertising strategy specification to the earlier-received page requests.

2. The method of claim 1 wherein assessing the results includes determining, for each of the plurality of advertising campaigns, the number of page requests earlier received against the subject web site for which the advertising campaign is selected.

3. The method of claim 1 wherein assessing the results includes determining, for each of the plurality of advertising campaigns, whether the number of page requests earlier received against the subject web site for which the advertising campaign is selected is at least as large as a predetermined minimum number of page requests for which the advertising campaign is to be selected.

4. The method of claim 1, further comprising:
   modifying the advertising strategy specification; and
   repeating the applying and assessing with the modified strategy specification.

5. The method of claim 4 wherein the advertising strategy specification is modified directly in response to user input specifying the modification.

6. The method of claim 4 wherein the advertising strategy specification is modified in a manner determined automatically.

7. The method of claim 4 wherein the advertising strategy specification is automatically modified in a manner designed to satisfy a user-defined goal.

8. The method of claim 4 wherein the advertising strategy specification is automatically modified in a manner that is compliant with a user-defined constraint.

9. The method of claim 1, further comprising selecting the sequence of page requests from page requests earlier received against the subject web site.

10. The method of claim 9 wherein the evaluation is for a defined future period, and wherein the sequence of page requests is selected based upon its likelihood to be representative of page requests received during the defined future period.

11. The method of claim 9 wherein the evaluation is for a defined future period, and wherein the selected sequence of page requests is a sequence of page requests received against the subject web site during an earlier period of the same length as the defined future period.

12. The method of claim 9 wherein the evaluation is for a defined future period, and wherein the selected sequence of page requests is a sequence of page requests received against the subject web site during an earlier period of the same length as the defined future period that immediately precedes the defined future period.

13. The method of claim 9 wherein the evaluation is for a defined future month, and wherein the selected sequence of page requests is a sequence of page requests received against the subject web site during the immediately previous month.

14. The method of claim 9 wherein the evaluation is for a defined interval within a defined super-interval, and wherein the selected sequence of page requests is a sequence of page requests received against the subject web site during an interval corresponding to the defined interval within a super-interval immediately preceding the defined super-interval.

15. The method of claim 9 wherein the evaluation is for a defined month within a defined year, and wherein the selected sequence of page requests is a sequence of page requests received against the subject web site during the defined month in the year preceding the defined year.

16. A computer-readable storage medium having executable instructions stored thereon to cause a computing system to evaluate an advertising strategy with respect to a subject web site, the computer-readable storage medium comprising:
   instructions to receive a specification of the advertising strategy, the specification indicating how to apply the advertising strategy to select one of a plurality of advertising campaigns in response to each page request against the subject web site;
   instructions to apply the advertising strategy in accordance with the received advertising strategy specification to a sequence of page requests earlier received against the subject web site; and
   instructions to access the results of applying the advertising strategy in accordance with the received advertising strategy specification to the earlier-received page requests.

17. The method of claim 1 wherein each of the plurality of advertising campaigns specifies a price per impression; and
   wherein the selection of one of the plurality of advertising campaigns is based on the specified price per impression.

18. The method of claim 1 wherein each of the plurality of advertising campaigns specifies a condition that is used to determine whether the advertising campaign is selected for an earlier received page request;
   wherein the advertising strategy specification specifies an order of precedence for each specified condition; and
   wherein the selection of one of the plurality of advertising campaigns is based on the specified order of precedence.

19. The method of claim 18 wherein the specified condition is selected from the group consisting of a page buy-out condition, a behavioral condition, and a run-of-site condition.

20. The method of claim 1 wherein at least two of the plurality of advertising campaigns are competing advertising campaigns conducted on behalf of two or more advertisers on the subject website.

21. A computing system for evaluating an ad serving strategy with respect to a subject web site, comprising:
- a page request memory storing a sequence of page requests earlier received for the subject web site;
- a simulation subsystem that reads the sequence of page requests from the page request memory and transforms the sequence of page requests into a corresponding sequence of advertising message selection requests; and
- an advertising message selection subsystem that selects from a plurality of advertising messages an advertising message responsive to each advertising message selection request in accordance with a specified ad serving strategy.

22. The computing system of claim 21, further comprising a result compilation subsystem that generates an indication of the number of times each of the plurality of advertising messages was selected.

23. The computing system of claim 21, further comprising a result compilation subsystem that identifies the advertising messages selected responsive to each advertising message request.

24. The computing system of claim 21 wherein the simulation subsystem submits each of the sequence of page requests to a web server that generates an advertising message selection request corresponding to each submitted page request.

25. The computing system of claim 21 wherein the simulation subsystem directly transforms each page request of the sequence into a corresponding of advertising message selection request.

26. The system of claim 21 further comprising a cookie memory that stores, for one or more of the earlier-received page requests, a cookie associated with a user from which the earlier-received page request was received; and
- wherein, when an earlier-received page request is associated with a cookie, the simulation subsystem attaches the cookie to the corresponding advertising message selection request.

* * * * *